US011262295B2

(12) United States Patent
Weilguni (10) Patent No.: US 11,262,295 B2
(45) Date of Patent: Mar. 1, 2022

(54) ELECTRONIC ARRANGEMENT, OPTICAL GAS SENSOR INCLUDING SUCH AN ELECTRONIC ARRANGEMENT, AND METHOD FOR COMBINED PHOTOCURRENT AND TEMPERATURE MEASUREMENT USING SUCH AN ELECTRONIC ARRANGEMENT

(71) Applicant: E+E Elektronik Ges.m.b.H., Engerwitzdorf (AT)

(72) Inventor: Michael Weilguni, Hagenberg (AT)

(73) Assignee: E+E ELEKTRONIK GES.M.B.H., Engerwiizdorf (AT)

( * ) Notice: Subject to any disclaimer, the term of this patent is extended or adjusted under 35 U.S.C. 154(b) by 510 days.

(21) Appl. No.: 16/439,741

(22) Filed: Jun. 13, 2019

(65) Prior Publication Data
US 2019/0383732 A1   Dec. 19, 2019

(30) Foreign Application Priority Data
Jun. 13, 2018 (EP) .................................... 18177605

(51) Int. Cl.
*G01J 1/44* (2006.01)
*G01N 21/3504* (2014.01)
*G01N 21/27* (2006.01)

(52) U.S. Cl.
CPC ......... *G01N 21/3504* (2013.01); *G01N 21/27* (2013.01); *G01N 2201/1211* (2013.01)

(58) Field of Classification Search
CPC .......... G01J 1/0252; G01J 1/44; G01N 21/27; G01N 21/3504; G01N 21/84
(Continued)

(56) References Cited

U.S. PATENT DOCUMENTS

| 4,764,732 A | 8/1988 | Dion |
| 9,625,662 B2 * | 4/2017 | Luk ........................ G01R 19/10 |

(Continued)

FOREIGN PATENT DOCUMENTS

| CN | 101589477 A | 11/2009 |
| CN | 201561800 U | 8/2010 |

(Continued)

OTHER PUBLICATIONS

Shih-Chung Lee, et al., "Linear Temperature Tuning of a Semiconductor Laser for Optogalvanic Spectroscopy," Chinese Journal of Lasers, Jul. 27, 2000, pp. 589-592, vol. A27, No. 7, Institute of Optical Science, Central University, Chung-Li, Taiwan.

(Continued)

*Primary Examiner* — Que Tan Le
(74) *Attorney, Agent, or Firm* — Leydig, Voit & Mayer Ltd.

(57) ABSTRACT

An electronic arrangement includes a first bias terminal, a ground terminal, a photodiode including an anode terminal and a cathode terminal, and a transimpedance amplifier including an operational amplifier. The electronic arrangement is selectively switchable to a photocurrent measurement mode and a temperature measurement mode. In the photocurrent measurement mode: the anode terminal is connected to a first input of the operational amplifier; the cathode terminal is connected to a second input of the operational amplifier; and the first bias terminal is connected to the first input of the operational amplifier and the anode terminal. In the temperature measurement mode: the anode terminal is connected to the ground terminal; the cathode terminal is connected to the second input of the operational amplifier; and the first bias terminal is connected to the first input of the operational amplifier and disconnected from the anode terminal.

15 Claims, 5 Drawing Sheets

(58) Field of Classification Search
USPC .................................. 250/214 R, 214.1, 238
See application file for complete search history.

(56) References Cited

U.S. PATENT DOCUMENTS

| | | |
|---|---|---|
| 2004/0052299 A1 | 3/2004 | Jay et al. |
| 2013/0265579 A1 | 10/2013 | Beckmann et al. |
| 2016/0231244 A1 | 8/2016 | Camargo et al. |

FOREIGN PATENT DOCUMENTS

| | | |
|---|---|---|
| CN | 102196197 A | 9/2011 |
| CN | 103002799 A | 3/2013 |
| CN | 103256980 A | 8/2013 |
| CN | 103746744 A | 4/2014 |
| CN | 104426614 A | 3/2015 |
| CN | 104596970 A | 5/2015 |
| CN | 105030254 A | 11/2015 |
| CN | 105593666 A | 5/2016 |
| CN | 205488130 U | 8/2016 |
| CN | 106104256 A | 11/2016 |
| DE | 102004049855 B3 | 2/2006 |
| DE | 102012007016 B3 | 10/2013 |
| EP | 3051274 A1 | 8/2016 |
| JP | S5837528 A | 3/1983 |
| JP | 2001013172 A | 1/2001 |
| TW | 201430899 A | 8/2014 |
| WO | WO 2007077437 A1 | 7/2007 |
| WO | WO 2009019467 A1 | 2/2009 |

OTHER PUBLICATIONS

Zhou Yujiao, et al., "Noise analysis of photoelectric detection circuit based on photodiode reverse bias," Infrared and Laser Engineering, Jan. 2016, pp. 1-6, vol. 45, No. 1, School of Electronic and Optical Engineering, Nanjing University of Science and Technology, Nanjing 210094, China.

Tai-Ping Sun, et al., "A novel readout integrated circuit with a dual-mode design for single- and dual-band infrared focal plane array," Infrared Physics & Technology, Mar. 2013, pp. 56-65, Elsevier B.V., Amsterdam, Netherlands.

N. A. Lockerbie, et al., "A low-noise transimpedance amplifier for the detection of "Violin-Mode" resonances in advanced Laser Interferometer Gravitational wave Observatory suspensions," Rev. Sci. Instrum. 85, 114705, Nov. 2014, pp. 1-9, AIP Publishing, Melville, New York, USA.

* cited by examiner

ELECTRONIC ARRANGEMENT, OPTICAL GAS SENSOR INCLUDING SUCH AN ELECTRONIC ARRANGEMENT, AND METHOD FOR COMBINED PHOTOCURRENT AND TEMPERATURE MEASUREMENT USING SUCH AN ELECTRONIC ARRANGEMENT

CROSS-REFERENCE TO PRIOR APPLICATION

Priority is claimed to European Patent Application No. EP 18177605.5, filed on Jun. 13, 2018, the entire disclosure of which is hereby incorporated by reference herein.

FIELD

The present invention relates to an electronic arrangement and an optical gas sensor including such an electronic arrangement. This invention also relates to a method for combined photocurrent and temperature measurement using such an electronic arrangement. The devices according to the invention and the method according to the invention can be used, in particular, in connection with optical gas sensors that use radiation in the mid-infrared range.

BACKGROUND

Measuring radiation in the mid-infrared range (MIR) using photodiodes is a promising future alternative to existing technologies (e.g., thermopiles or pyrodetectors) for optical detection of gases, such as, for example, $CO_2$. For example, today's photodiodes are already a factor of 3 more sensitive than thermopiles although they have a smaller detection area. Disadvantageously, due to the working principle of photodiodes, their photosensitivity is very much temperature-dependent. Therefore, to be able to use MIR photodiodes over a wide temperature range in gas sensors, it is necessary to accurately measure the temperature (ideally directly at the junction of the photodiode).

Some commercially available detector modules measure the ambient temperature via a microcontroller. A disadvantage of this method is that the temperature measurement is not accurate enough for an extended temperature range. Differences of a few $1/10°$ C. between the photodiode and microcontroller temperatures can lead to significant errors in the determination of the gas concentration.

WO 2009/019467 A1 describes an optical gas sensor having a MIR photodiode, where temperature is measured by the photodiode itself. This measurement is based on measuring the forward voltage at a constant current; i.e., on a measurement in the first quadrant of the current-voltage characteristic of the photodiode.

DE 10 2012 007 016 B3 proposes to use the temperature-dependent behavior of a photodiode for temperature measurement in an optical gas sensor. The measurement principle is also based on measuring the forward voltage at a constant current.

EP 3 051 274 A1 proposes to use a photodiode of an optical gas sensor at the same time as a temperature sensor. To this end, a current is impressed in the reverse direction, and the temperature-dependent reverse voltage is measured. The photocurrent then also manifests itself as a voltage in the forward direction, which is amplified in an AC-coupled manner. The measured voltage is here non-linearly dependent on the photocurrent.

SUMMARY

In an embodiment, the present invention provides an electronic arrangement includes a first bias terminal, a ground terminal, a photodiode including an anode terminal and a cathode terminal, and a transimpedance amplifier including an operational amplifier. The electronic arrangement is selectively switchable to a photocurrent measurement mode and a temperature measurement mode. In the photocurrent measurement mode: the anode terminal is connected to a first input of the operational amplifier; the cathode terminal is connected to a second input of the operational amplifier; and the first bias terminal is connected to the first input of the operational amplifier and the anode terminal. In the temperature measurement mode: the anode terminal is connected to the ground terminal; the cathode terminal is connected to the second input of the operational amplifier; and the first bias terminal is connected to the first input of the operational amplifier and disconnected from the anode terminal.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

A disadvantage of known gas sensors is, on the one hand, the relatively inaccurate measurement of the photodiode temperature if the temperature is determined by an additional sensor and, on the other hand, a relatively complex circuitry for the combined measurement of the photodiode temperature and the photocurrent.

In an embodiment, the present invention provides an electronic arrangement and a method for combined photocurrent and temperature measurement that allow the temperature of a photodiode, such as one in an optical gas sensor, to be accurately and reliably measured over a relatively wide temperature range with relatively little circuit complexity.

The hereinafter described features of the electronic arrangement according to different embodiments may also be correspondingly implemented in the optical gas sensor according to different embodiments and vice versa. Likewise, features of the method according to different embodiments may be reflected in features of the electronic arrangement and/or of the optical gas sensor according to different embodiments and vice versa.

In accordance with a first embodiment, an electronic arrangement includes a photodiode and a transimpedance amplifier. The electronic arrangement is selectively switchable to a photocurrent measurement mode and a temperature measurement mode. In the photocurrent measurement mode, an anode terminal of the photodiode is connected to a first input of an operational amplifier of the transimpedance amplifier, a cathode terminal of the photodiode is connected to a second input of the operational amplifier, and a first bias terminal is connected to the first input and to the anode terminal. In the temperature measurement mode, the anode terminal is connected to a ground terminal, the cathode terminal is connected to the second input, and the first bias terminal is connected to the first input and disconnected from the anode terminal.

In the context of the present application, a statement according to which an electrical element is "connected" to another electrical element means that a low-resistance electrical connection exists between the two electrical elements.

Furthermore, the term "ground" should be understood to refer to a structure that provides a reference potential. This may, but need not necessarily, be the ground potential.

According to a second embodiment, an optical gas sensor includes the following: a measurement cell for receiving a gas; a radiation source for emitting radiation onto the gas received in the measurement cell; and a photodiode for detecting at least portions of the radiation, the gas received in the measurement cell being at least partially located between the radiation source and the photodiode. For combined photocurrent and temperature measurement by means of the photodiode, the optical gas sensor includes an electronic arrangement in accordance with the first embodiment of the present invention. In other words, the photodiode of the optical gas sensor that is used for gas detection is at the same time a photodiode of the electronic arrangement in accordance with the first embodiment of the present invention.

A third embodiment provides a method for combined photocurrent and temperature measurement, which method includes the following steps: providing an electronic arrangement in accordance with the first embodiment of the present invention; operating the electronic arrangement in one of the two measurement modes: photocurrent measurement mode and temperature measurement mode; and switching the electronic arrangement to the respective other one of the photocurrent and temperature measurement modes.

In the following, reference is made to all three of the aforementioned embodiments.

Embodiments of the present invention provide that an electronic arrangement including a photodiode and a transimpedance amplifier can be designed such that it supports easy switching between a photocurrent measurement mode and a temperature measurement mode with relatively little circuit complexity. This can be achieved by interconnecting the electronic arrangement in such a way that in the photocurrent measurement mode, an anode terminal of the photodiode is connected to a first input of the operational amplifier, and that in the temperature measurement mode, it is connected to a ground terminal. In both of the aforementioned modes, a cathode terminal of the photodiode is connected to a second input of the operational amplifier.

Moreover, in the photocurrent measurement mode, a first bias terminal is connected to both the first input and the anode terminal, whereas in the temperature measurement mode, the first bias terminal is connected to the first input and disconnected from the anode terminal.

In both of the aforementioned modes of the electronic arrangement, the transimpedance amplifier is configured to convert a respective diode current of the photodiode into an output voltage. More specifically, in the photocurrent measurement mode and in the temperature measurement mode, an output voltage proportional to the respective diode current of the photodiode can be tapped between the first bias terminal and an output voltage tap of the transimpedance amplifier, which is connected to an output of the operational amplifier.

In the photocurrent measurement mode, the operational amplifier enables the photodiode to be operated in a quasi-short circuit. The operational amplifier can adjust a potential at the second input at least approximately to the value of a bias potential present at the first bias terminal. In other words, the second input is an inverting input of the operational amplifier, which provides what is referred to as "virtual ground" with (at least approximately) the bias potential as a reference potential. Since, in the photocurrent measurement mode, the cathode terminal and the anode terminal are consequently kept at least approximately at the same potential, namely the bias potential, a photocurrent generated in the photodiode can flow in the quasi-short circuit. The photocurrent can be measured along the negative Y-axis of the current-voltage characteristic of the photodiode.

In the temperature measurement mode, the cathode terminal is at least approximately at the bias potential, whereas the anode terminal is at a reference potential of the ground terminal. Therefore, in the case of a positive bias potential, a negative bias is applied to the photodiode, which negative bias drives a highly temperature-dependent reverse current through the photodiode. The reverse current can thus be measured to determine the temperature in the third quadrant of the current-voltage characteristic of the photodiode.

In an embodiment, the electronic arrangement includes a number of switching elements, which allow the electronic arrangement to be switched between the photocurrent measurement mode and the temperature measurement mode. In particular, the electronic arrangement may be configured such that switching is performed by means of three switching elements.

In an embodiment, the transimpedance amplifier includes an electrical negative feedback path which runs in parallel to the operational amplifier and connects the second input to the output voltage tap. In the negative feedback path, a negative feedback partial resistor $R_{F'}$ and a first resistor $R_1$ are connected in series.

In a refinement, the electronic arrangement additionally includes a second bias terminal which is connectable via a first switching element to the negative feedback path in a region between negative feedback partial resistor $R_F'$ and first resistor $R_1$. The first switching element is closed in the photocurrent measurement mode and open in the temperature measurement mode. In this connection, in a variant, the second bias terminal may be connected to the first bias terminal or even be identical therewith.

Preferably, a second resistor $R_2$ is disposed between the second bias terminal and the negative feedback path. In this connection, the cathode terminal is switchably connectable to the second bias terminal via the first switching element, negative feedback partial resistor $R_{F'}$ and second resistor $R_2$.

Thus, in the photocurrent measurement mode, first resistor $R_1$ and second resistor $R_2$ form a voltage divider which reduces the output voltage of the operational amplifier. Thus, in the photocurrent measurement mode, a current amplifier is obtained whose gain is:

$$R'_F \cdot \left(1 + \frac{R_1}{R_2}\right)$$

In contrast, in the temperature measurement mode, an open connection acts in place of second resistor $R_2$, and the gain is reduced to $R_F' + R_1$.

In an embodiment, the anode terminal is connectable via a second switching element to both the first input and the first bias terminal. The second switching element is closed in the photocurrent measurement mode and open in the temperature measurement mode.

Furthermore, the anode terminal is preferably connectable to a ground terminal via a third switching element. This third switching element is open in the photocurrent measurement mode and closed in the temperature measurement mode. In other words, in order to switch the electronic arrangement to the photocurrent measurement mode, the first and second switching elements can be closed and the third switching element can be opened. In order to switch the electronic arrangement to the temperature measurement mode, the first and second switching elements can be opened and the third switching element can be closed.

The radiation source of the optical gas sensor according to the present invention may advantageously be configured to emit an infrared radiation, in particular a mid-infrared radiation (MIR), for example with wavelengths in the range of about μm. MIR radiation is suitable for optical detection of gases, such as, for example, $CO_2$.

When operating an electronic arrangement which, as described above, has a second bias terminal in addition to the first bias terminal, it is preferred to provide the same bias potential at the first bias terminal and at the second bias terminal. For example, the same positive bias potential may be provided at the first bias terminal and at the second bias terminal.

If the electronic arrangement is part of an optical gas sensor according to the present invention, provision may be made to operate it first in the temperature measurement mode while the radiation source is off, and then in the photocurrent measurement mode while the radiation source is on.

Figure 1:
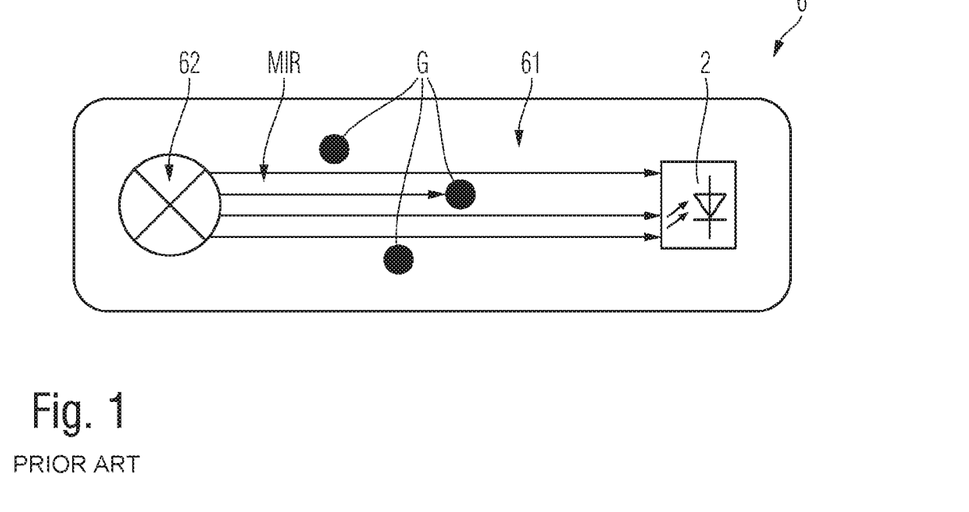
FIG. 1 shows exemplarily and schematically an optical gas sensor known in the art.

FIG. 1 illustrates, in schematic and exemplary form, an optical gas sensor 6 whose basic design is known in the art. Here, an infrared radiation source 62 (e.g., an incandescent lamp) emits thermal radiation MIR. Measurement cell 61, which contains the gas G to be measured (e.g., $CO_2$), is located between a detector (here represented as a photodiode 2) and radiation source 62. Gas G absorbs a portion of thermal radiation MIR at certain wavelengths. Depending on the gas concentration, more or less photocurrent is delivered by photodiode 2. Thus, a signal from photodiode 2 can be used for determining the concentration of the gas.

Figure 2:
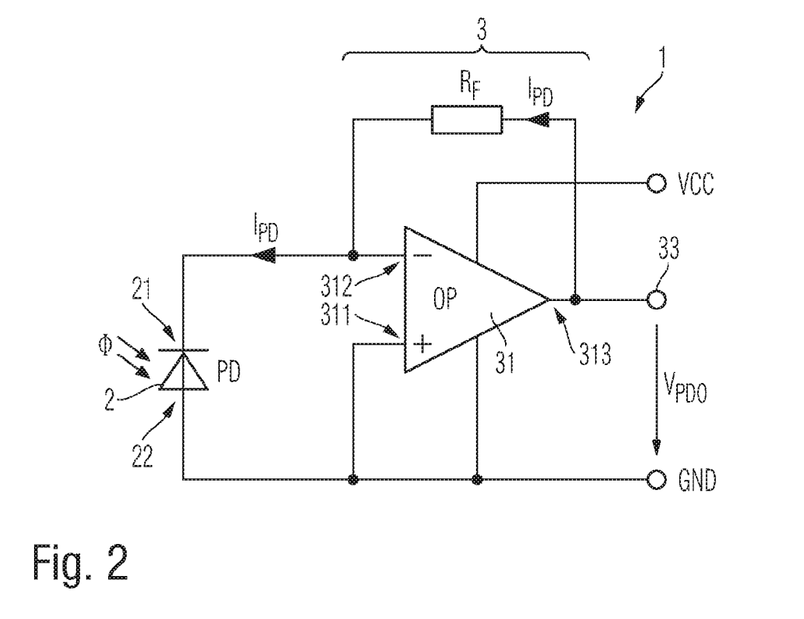
FIG. 2 shows exemplarily and schematically a prior art electronic arrangement for photocurrent measurement.

FIG. 2 shows, by way of example and schematically, an electronic arrangement 1 for photocurrent measurement, which may be used, for example, in an optical gas sensor 6 of the type described above. For photocurrent measurement, it is typical to use a transimpedance amplifier 3 (also referred to as "current amplifier"), which is configured to convert a photodiode current $I_{PD}$ of photodiode 2 into an output voltage $V_{PDO}$. Transimpedance amplifier 3 includes an operational amplifier 31, an anode terminal 22 of photodiode 2 being connected to a first input 311 of operational amplifier 31, and a cathode terminal 21 of photodiode 2 being connected to a second input 312 of operational amplifier 31.

Second input 312 is an inverting input of operational amplifier 31. This means that operational amplifier 31 is configured to adjust a potential at second input 312 at least approximately to the value of ground potential GND present at first input 311, and thus to generate what is referred to as "virtual ground" at second input 312. Due to the virtual ground, photodiode 2 is operated in a quasi-short circuit.

A negative feedback path which runs in parallel to operational amplifier 31 connects second input 312 to an output voltage tap 33 of transimpedance amplifier 3, which is connected to an output 313 of operational amplifier 31, the negative feedback path having a negative feedback resistor $R_F$ disposed therein. When photodiode 2 is operated in quasi-short circuit, output voltage $V_{PDO}$ can be tapped between an output voltage tap 33 and ground GND, the output voltage being linearly dependent on radiant power Φ incident on photodiode 2 and a photodiode current $I_{PD}$ resulting therefrom. In this connection, a gain is provided by negative feedback resistor $R_F$ as follows:

$V_{PDO} = I_{PD} \cdot R_F$.

Figure 3:
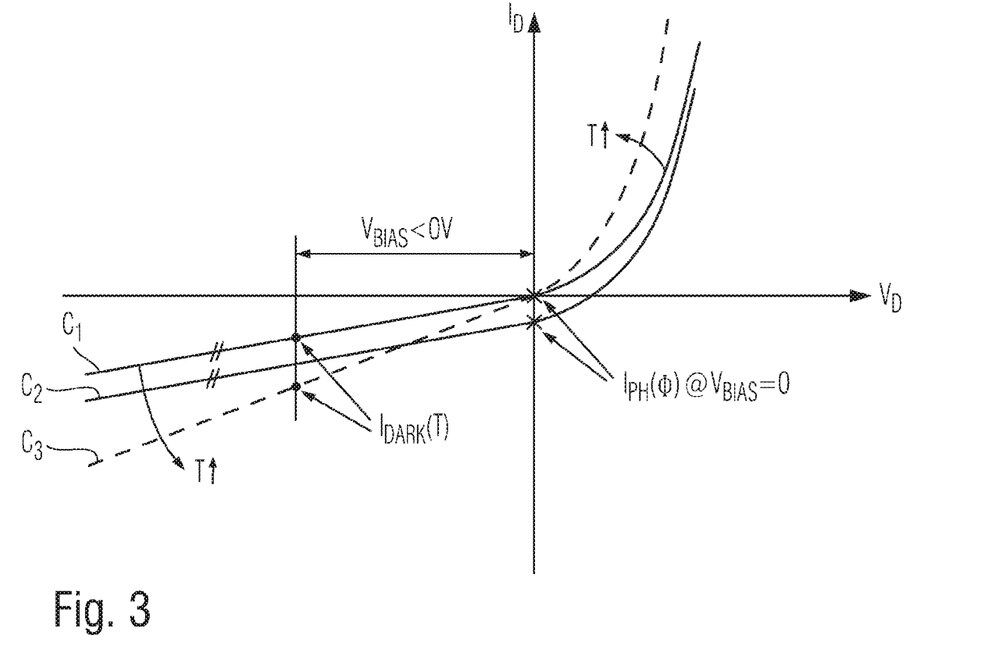
FIG. 3 shows exemplarily and schematically a current-voltage characteristic of a photodiode with measurement points for a temperature measurement and a photocurrent measurement in accordance with one or more embodiments.

FIG. 3 illustrates the principle of the photocurrent measurement by way of a current-voltage characteristic, in which diode current $I_D$ (y-axis) is plotted against diode voltage $V_D$ (x-axis) of photodiode 2. The curve $C_1$ passing through the origin corresponds to a diode characteristic curve without incident radiation; i.e., in the dark. When photodiode 2 is illuminated by an infrared source 62, the diode characteristic curve is parallelly shifted down, as schematically illustrated by curve $C_2$. Thus, the above-described operation in (quasi-)short circuit corresponds to a measurement of a photocurrent $I_{PH}$ on the negative y-axis (exemplary measurement points are marked with an "x"). Typical photocurrents $I_{PH}$ are on the order of 10 nA, depending on radiation source 62, the cell geometry, the optical filter used, etc. In this connection, for example, a negative feedback resistor $R_F$ of about 100 MΩ can be used for an output voltage $V_{PDO}$ of about 1 V. This photocurrent $I_{PH}$ shows a strong temperature dependence.

When the temperature changes (indicated in FIG. 3 by the symbol T↑), the characteristic curve of photodiode 2 rotates. For example, an increase in temperature causes the diode characteristic curve to rotate counterclockwise, as schematically illustrated in FIG. 3 by the dashed third curve C3. For temperature measurement, it is possible, for example, to impress a diode current ID in the forward direction, and to measure voltage VD in the $1^{st}$ quadrant (i.e., in the conducting region). Alternatively, it is possible to apply a negative bias $V_{BIAS} < 0$ to photodiode 2, and to measure temperature-dependent dark current $I_{DARK}$ in the $3^{rd}$ quadrant (i.e., in the blocking region). Exemplary measurement points are marked with black dots in FIG. 3. The latter method can be readily combined with the previously described photocurrent measurement because a current amplifier 3 is already present.

At low levels of bias $V_{BIAS}$, dark current $I_{DARK}$ increases approximately linearly with the value of bias $|V_{BIAS}|$ (due to the voltage dependence of the depletion layer width) and exponentially with temperature T. Typical values of dark current $I_{DARK}$ at room temperature may be, for example, around 120 kOhm. Due to the low quantum efficiency of MIR photodiode 2, temperature-dependent dark current $I_{DARK}$ (T) can, at a bias as low as a few mV, already be as large as photocurrent $I_{PH}(\Phi)$ during illumination without bias ($V_{BIAS}=0$). It may therefore be advantageous if bias does not exceed the µV range during the measurement of photocurrent $I_{PH}$. For measurement at low frequencies, for example in the Hz range, it is suitable to use a zero-drift operational amplifier.

Figure 4A:
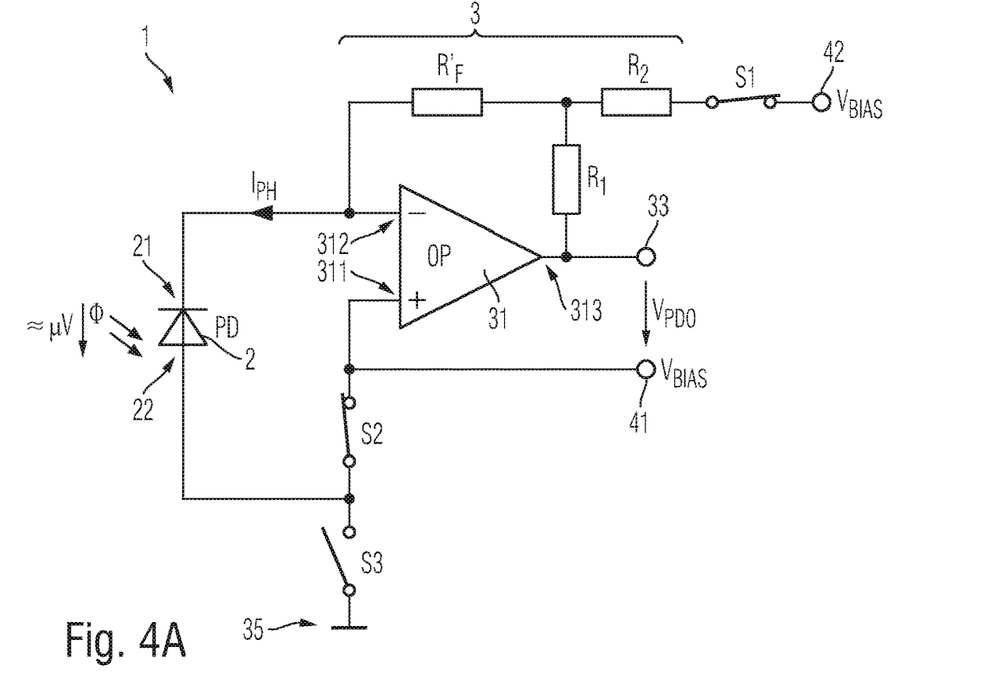
FIG. 4A shows exemplarily and schematically an electronic arrangement in a photocurrent measurement mode in accordance with one or more embodiments.
Figure 4B:
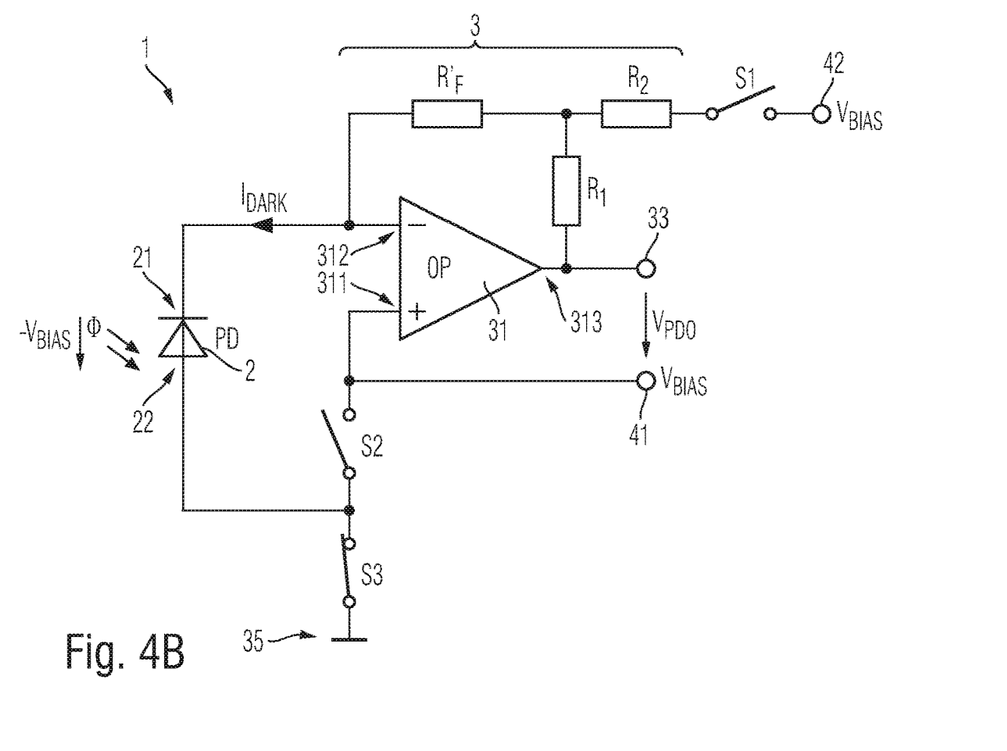
FIG. 4B shows exemplarily and schematically the electronic arrangement of FIG. 4A in a temperature measurement mode.

FIGS. 4A and 4B show, in schematic form, an electronic arrangement 1 according to an embodiment of the present invention, which combines photocurrent and temperature measurement. In comparison to the one shown in FIG. 2, the electronic arrangement 1 has only a few additional components and allows easy switching between a temperature measurement mode and a photocurrent measurement mode.

For example, as explained above, a MIR photodiode 2 and a transimpedance amplifier 3 are used, the transimpedance amplifier 3 including an operational amplifier 31, e.g., in the form of a zero-drift operational amplifier. In the photocurrent measurement mode shown in FIG. 4A, anode terminal 22 of photodiode 2 is connected to a first input 311 of operational amplifier 31, and cathode terminal 21 of photodiode 2 is connected to a second input 312 of operational amplifier 31. Furthermore, a first bias terminal 41 of electronic arrangement 1 is connected to first input 311 and anode terminal 22. Transimpedance amplifier 3 is configured to allow photodiode 2 to be operated in a quasi-short circuit. This is because operational amplifier 31 is configured to adjust a potential at second input 312 at least approximately to the value of a bias potential $V_{BIAS}$ present at first bias terminal 41. In other words, a virtual ground with (at least approximately) the bias potential $V_{BIAS}$ is provided as a reference potential at second input 312.

In contrast, in the temperature measurement mode shown in FIG. 4B, anode terminal 22 is connected to a ground terminal 35 of electronic arrangement 1, cathode terminal 21 is connected to second input 312, and first bias terminal 41 is connected to first input 311 and disconnected from the anode terminal 22.

Both in the photocurrent measurement mode and in the temperature measurement mode, an output voltage $V_{PDO}$ proportional to the respective diode current $I_{PH}$, $I_{DARK}$ of photodiode 2 can be tapped between first bias terminal 41 and an output voltage tap 33 of transimpedance amplifier 3, which is connected to an output 313 of operational amplifier 31.

In the electronic arrangement 1 according to FIGS. 4A-B, transimpedance amplifier 3 includes a negative feedback path which runs in parallel to operational amplifier 31 and connects second input 312 to output voltage tap 33. In the negative feedback path, a negative feedback partial resistor $R_F'$ and a first resistor $R_1$ are connected in series. Furthermore, a second bias terminal 42 is provided which is connectable via a first switching element S1 to the negative feedback path in a region between negative feedback partial resistor $R_F'$ and first resistor $R_1$. A second resistor $R_2$ is connected between second bias terminal 42 and the negative feedback path.

Cathode terminal 21 is switchably connectable to second bias terminal 42 via negative feedback partial resistor $R_F'$, second resistor $R_2$ and first switching element S1. Anode terminal 22 is connectable via a second switching element S2 to both first input 311 and first bias terminal 41. In addition, anode terminal 22 is connectable to a ground terminal 35 via a third switching element S3.

Electronic arrangement 1 can be switched between the photocurrent measurement mode and the temperature measurement mode by operating the three switching elements S1, S2, S3. The operation of electronic arrangement 1 in the photocurrent measurement mode and in the temperature measurement mode can be performed, for example, as follows:

In the photocurrent measurement mode (see FIG. 4A), first switching element S1 and second switching element S2 are closed, whereas third switching element S3 is open. The bias potential $V_{BIAS}$ applied from outside to first bias terminal 41 and second bias terminal 42 is preferably selected such that with the given resistors $R_1$, $R_2$, $R_F'$, operational amplifier 31 will not go into its upper or lower limit, even in a worst-case scenario (that is, for example, taking into account possible offsets or quiescent currents). The potential at anode terminal 22 of photodiode 2 is equal to bias potential $V_{BIAS}$. Due to the control behavior of the operational amplifier 31 (virtual ground), cathode terminal 21 is substantially also at bias potential $V_{BIAS}$, so that photodiode 2 is operated in quasi-short circuit. $R_1$ and $R_2$ together form a voltage divider which reduces output voltage $V_{PDO}$. In combination with negative feedback partial resistor $R_F'$, a current amplifier is obtained whose gain is $$R_F' \cdot \left(1 + \frac{R_1}{R_2}\right).$$

When a radiation source 62 (see FIG. 1) is used in the photocurrent measurement mode, the gas concentration in measurement cell 61 can be inferred from output voltage signal $V_{PDO}$.

In the temperature measurement mode (see FIG. 4B, first switching element S1 and second switching element S2 are open, and third switching element S3 is closed. Anode terminal 22 of photodiode 2 is connected to ground terminal 35. Preferably, bias potential $V_{BIAS}$ is selected such that with the given resistors $R_F'$, $R_1$, operational amplifier 31 will not go into its upper limit because of dark current $I_{DARK}$. First input 311 of operational amplifier 31 is at the (positive) bias potential $V_{BIAS}$. Due to the virtual ground of operational amplifier 31, a negative bias having the value $-V_{BIAS}$ is now effectively applied to photodiode 2. In comparison to the photocurrent measurement mode, the gain of output voltage $V_{PDO}$ is reduced to $$R_F' + R_1.$$

In this operating mode, radiation source 62 preferably remains off. Output voltage signal $V_{PDO}$ is dependent on the temperature of photodiode 2.

Figure 5:
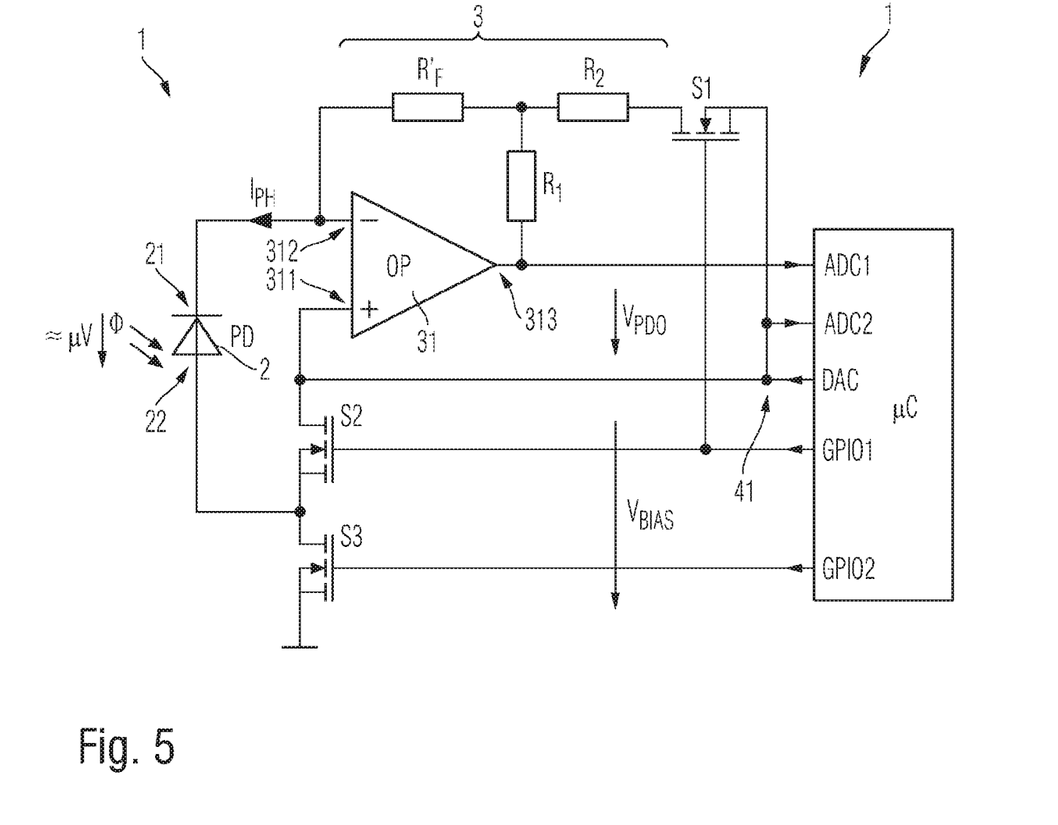
FIG. 5 shows exemplarily and schematically a practical implementation of an electronic arrangement in accordance with one or more embodiments.

FIG. 5 exemplarily illustrates a practical implementation of the above-described electronic arrangement 1. In this example, switching elements S1, S2, S3 take the form of MOSFETs which are turned on or off via general purpose input/output (GPIO) ports GPIO1, GPIO2 of a microcontroller µC. Bias potential $V_{BIAS}$ is generated by a buffered digital-to-analog converter (DAC) output DAC of microcontroller µC. It is also possible to use a reference that can switch between two different constant voltage values. However, the circuit may also be dimensioned such that bias potential $V_{BIAS}$ remains the same for photocurrent and temperature measurements. In this case, a single reference can be used. Output voltage signal $V_{PDO}$ is measured using two analog-to-digital converter (ADC) inputs ADC1, ADC2. Microcontroller µC calculates the difference between the two values. However, it is also possible to use an ADC with a differential input. By suitable selection of resistors $R_1$, $R_2$, $R_F'$, the circuit can be adapted such that in both measurements (photocurrent and temperature measurements), the ADC is optimally used; i.e. in a maximum dynamic range. In a variant, third switching element S3 may also be directly replaced by an open-drain output of the microcontroller μC. FIG. 5 shows a circuit for a single photodiode 2. For an optical gas sensor 6 having a dual detector (gas photodiode and reference photodiode), the circuit can be built twice. In this case, second switching element S2 and third switching element S3 may be shared by both circuits.

Figure 6:
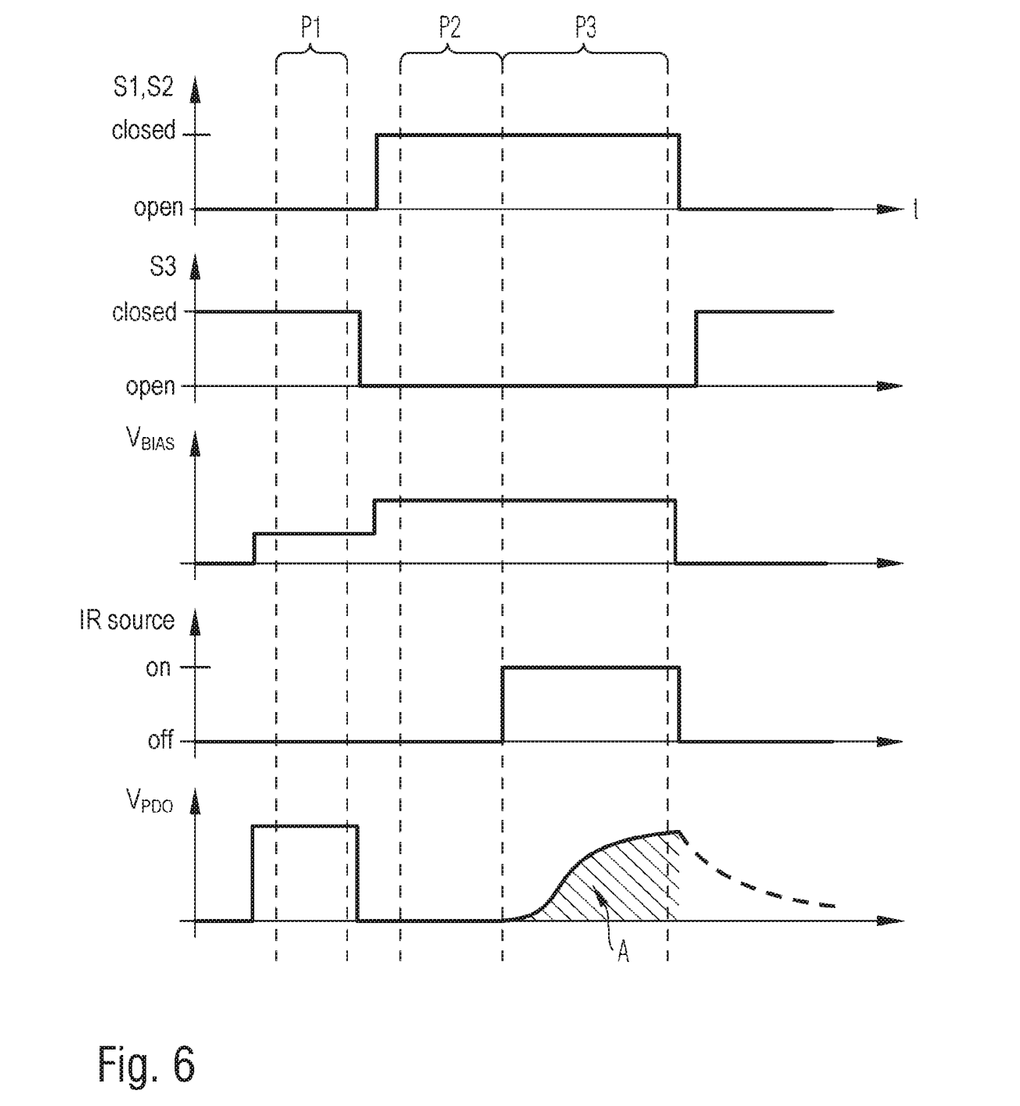
FIG. 6 shows a switching sequence for a combined photocurrent and temperature measurement in accordance with one or more embodiments.

FIG. 6 illustrates the measuring sequence for a combined photocurrent and temperature measurement based on an exemplary switching sequence of switching elements S1, S2, S3. Plotted against a time axis t is the respective switching state of switching elements S1, S2, S3 as well as the corresponding time profiles of bias potential $V_{BIAS}$, of the on/off state of radiation source 62 and of the resulting output voltage signal $V_{PDO}$.

Initially, optical gas sensor 6 is in standby mode. First switching element S1 and second switching element S2 are open, while third switching element S3 is closed (function as a temperature sensor). No bias $V_{BIAS}$ is applied. Infrared radiation source 62 is off.

In the first step, a (positive) bias potential $V_{BIAS}$ is then applied for temperature measurement. After a short stabilization time, output voltage signal $V_{PDO}$ provides a signal proportional to temperature. This first phase P1 thus corresponds to the temperature measurement.

After the temperature measurement is completed, third switching element S3 is opened and switching elements S1 and S2 are closed. Bias $V_{BIAS}$ may, if necessary, be switched to a different value. Electronic arrangement 1 now functions as a photocurrent sensor. Initially, infrared radiation source 62 is still off. Second phase P2 may be used, for example, to measure a quiescent gas signal. This makes it possible, for example, to later compensate for a possible circuit offset.

In third phase P3, infrared radiation source 62 is turned on. As infrared radiation source 62 warms up, output voltage signal $V_{PDO}$ begins to rise. Output voltage signal $V_{PDO}$ increases to a greater or lesser extent as a function of the gas concentration. An area A under the output voltage curve may be used, for example, as a starting value for a calculation of the gas concentration. Then, using microcontroller μC, a temperature-compensated gas concentration can be determined from the two signals; i.e., from the detector temperature and the response to a radiation pulse.

The measuring sequence shown in FIG. 6 is only one possible example. The determination of the gas concentration may also be performed according to a different scheme, such as by multiple successive flashes of radiation source 62 or by using other parameters than the area under the output voltage curve (for example, based on a FFT analysis, a gradient at a certain point in time, etc.).

In the case that two or more photodiodes are used (e.g. as a dual-detector) in a optical gas sensor of the type described, measurement of the different photodiode temperatures also allows possible temperature gradients between the photodiodes to be determined and compensated for. The average temperature of the different photodiodes (and/or a temperature of an NTC sensor or of a microcontroller) may be used, for example, as an estimator for the gas temperature, which is more reliable than the conventionally used temperature of a single NTC sensor.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An electronic arrangement, comprising:
   a first bias terminal;
   a ground terminal;
   a photodiode including an anode terminal and a cathode terminal; and
   a transimpedance amplifier including an operational amplifier,
   wherein the electronic arrangement is selectively switchable to a photocurrent measurement mode and a temperature measurement mode, and wherein:
   in the photocurrent measurement mode:
   the anode terminal is connected to a first input of the operational amplifier;
   the cathode terminal is connected to a second input of the operational amplifier; and
   the first bias terminal is connected to the first input of the operational amplifier and the anode terminal, and
   in the temperature measurement mode:
   the anode terminal is connected to the ground terminal;
   the cathode terminal is connected to the second input of the operational amplifier; and
   the first bias terminal is connected to the first input of the operational amplifier and disconnected from the anode terminal.

2. The electronic arrangement as recited in claim 1, wherein, in the photocurrent measurement mode and in the temperature measurement mode, an output voltage proportional to a respective diode current of the photodiode can be tapped between the first bias terminal and an output voltage tap of the transimpedance amplifier.

3. The electronic arrangement as recited in claim 1, wherein the second input of the operational amplifier is an inverting input of the operational amplifier.

4. The electronic arrangement as recited in claim 1, wherein the operational amplifier is configured to adjust a potential at the second input at least approximately to a value of a bias potential present at the first bias terminal.

5. The electronic arrangement as recited in claim 1, wherein the transimpedance amplifier includes a negative feedback path which runs in parallel to the operational amplifier and connects the second input of the operational amplifier to an output voltage tap of the transimpedance amplifier, the negative feedback path having a negative feedback partial resistor and a first resistor connected in series therein.

6. The electronic arrangement as recited in claim 5, wherein the first bias terminal or a second bias terminal of the electronic arrangement is connectable via a first switching element to the negative feedback path in a region between the negative feedback partial resistor and the first resistor.

7. The electronic arrangement as recited in claim 6, wherein a second resistor is disposed between the first bias terminal and the negative feedback path, or between the second bias terminal and the negative feedback path.

8. The electronic arrangement as recited in claim 6, wherein the cathode terminal is switchably connectable via the first switching element to the first bias terminal, or to the second bias terminal.

9. The electronic arrangement as recited in claim 1, wherein the anode terminal is connectable via a second switching element to both the first input of the operational amplifier and the first bias terminal.

10. The electronic arrangement as recited in claim 1, wherein the anode terminal is connectable via a third switching element to the ground terminal.

11. An optical gas sensor, comprising:
a measurement cell designed to receive a gas; and
a radiation source configured to emit radiation onto the gas received in the measurement cell; and
a photodiode configured to detect at least portions of the radiation, the gas received in the measurement cell being at least partially located between the radiation source and the photodiode,
wherein for combined photocurrent and temperature measurement by the photodiode, the optical gas sensor includes the electronic arrangement as recited in claim 1.

12. A method for combined photocurrent and temperature measurement, the method comprising:
providing the electronic arrangement according to claim 1;
operating the electronic arrangement in one of the two measurement modes; and
switching the electronic arrangement to the respective other one of the two measurement modes.

13. The method as recited in claim 12, wherein the transimpedance amplifier includes a negative feedback path which runs in parallel to the operational amplifier and connects the second input of the operational amplifier to an output voltage tap of the transimpedance amplifier, the negative feedback path having a negative feedback partial resistor and a first resistor connected in series therein, wherein the first bias terminal or a second bias terminal of the electronic arrangement is connectable via a first switching element to the negative feedback path in a region between the negative feedback partial resistor and the first resistor, and wherein the same positive bias potential is provided at the first bias terminal and at the second bias terminal.

14. The method as recited in claim 13, wherein a second resistor is disposed between the first bias terminal and the negative feedback path, or between the second bias terminal and the negative feedback path, wherein the anode terminal is connectable via a third switching element to the ground terminal, and wherein:
in order to switch the electronic arrangement to the photocurrent measurement mode, the first and second switching elements are closed and the third switching element is opened; and/or
in order to switch the electronic arrangement to the temperature measurement mode, the first and second switching elements are opened and the third switching element is closed.

15. The method as recited in claim 12, wherein the electronic arrangement is part of an optical gas sensor, and wherein the electronic arrangement is:
first operated in the temperature measurement mode while a radiation source of the optical gas sensor is off, and then
operated in the photocurrent measurement mode while the radiation source is on.

* * * * *